US008556130B2

(12) United States Patent
Law et al.

(10) Patent No.: US 8,556,130 B2

(45) Date of Patent: Oct. 15, 2013

(54) PUMP DISPENSERS

(75) Inventors: Brian Robert Law, Leicester (GB); David John Pritchett, Ashby de la Zouch (GB)

(73) Assignee: Rieke Corporation, Auburn, IN (US)

( * ) Notice: Subject to any disclaimer, the term of this patent is extended or adjusted under 35 U.S.C. 154(b) by 170 days.

(21) Appl. No.: 13/006,465

(22) Filed: Jan. 14, 2011

(65) Prior Publication Data

US 2012/0024907 A1 Feb. 2, 2012

(30) Foreign Application Priority Data

Jan. 14, 2010 (GB) .................................. 1000601.0

(51) Int. Cl.
*G01F 11/00* (2006.01)

(52) U.S. Cl.
USPC .......................................................... 222/256

(58) Field of Classification Search
USPC ............................... 222/256, 259, 321.7, 387
See application file for complete search history.

(56) References Cited

U.S. PATENT DOCUMENTS

| | | | |
|---|---|---|---|
| 2,774,517 | A | 12/1956 | Teegardin et al. |
| 2,919,056 | A | 12/1959 | Collins |
| 3,379,136 | A | 4/1968 | Corsette |
| 4,118,152 | A | 10/1978 | Bron |
| 4,277,001 | A | 7/1981 | Nozawa |
| 4,286,736 | A | 9/1981 | Corsette et al. |
| 4,360,130 | A | 11/1982 | Nishimura et al. |
| 4,364,718 | A | 12/1982 | Beun et al. |
| 4,371,098 | A | 2/1983 | Nozawa et al. |
| 4,589,573 | A | 5/1986 | Tada |
| 4,673,109 | A | 6/1987 | Cassia |
| 4,775,079 | A | 10/1988 | Grothoff |
| 4,776,498 | A | 10/1988 | Maerte et al. |
| 4,811,871 | A | 3/1989 | Wass et al. |
| 4,958,752 | A | 9/1990 | Maerte et al. |
| 5,016,780 | A | 5/1991 | Moretti |
| 5,115,980 | A | 5/1992 | Skorka |
| 5,165,577 | A | 11/1992 | Ophardt |

(Continued)

FOREIGN PATENT DOCUMENTS

| | | |
|---|---|---|
| DE | 39 29 064 A | 1/1991 |
| EP | 0 098 939 A2 | 1/1984 |

(Continued)

OTHER PUBLICATIONS

European Patent Application 04255318 Search Report mailed Jun. 14, 2006.

(Continued)

*Primary Examiner* — J. Casimer Jacyna
*Assistant Examiner* — Vishal Pancholi
(74) *Attorney, Agent, or Firm* — Woodard Emhardt Moriarty McNett & Henry LLP

(57) ABSTRACT

A pump dispenser in which the associated container interior reduces its volume progressively as product is dispensed to avoid air contact with the product. An air trap member having a downwardly-convex dish form is provided below a floor of the associated dispenser module around an inlet to guide any such air away from the inlet. A peripheral portion forms a retaining lip for flexible wiping contact with the container wall interior, allowing air passage on assembly of the dispenser. A central tubular formation of the trap member separates the trapped air from the inlet and can be used to plug the trap member into the inlet.

14 Claims, 9 Drawing Sheets

(56) References Cited

U.S. PATENT DOCUMENTS

| | | | | |
|---|---|---|---|---|
| 5,282,552 | A | 2/1994 | Ophardt | |
| 5,353,969 | A | 10/1994 | Balderrama | |
| 5,373,970 | A | 12/1994 | Ophardt | |
| 5,401,148 | A | 3/1995 | Foster et al. | |
| 5,431,309 | A | 7/1995 | Ophardt | |
| 5,445,288 | A | 8/1995 | Banks | |
| 5,489,044 | A | 2/1996 | Ophardt | |
| 5,548,943 | A | 8/1996 | Behar et al. | |
| 5,676,277 | A | 10/1997 | Ophardt | |
| 5,738,250 | A | 4/1998 | Gillingham et al. | |
| 5,813,576 | A | 9/1998 | Iizuka et al. | |
| 5,904,272 | A | 5/1999 | Kaufman et al. | |
| 5,975,360 | A | 11/1999 | Ophardt | |
| 5,988,456 | A | 11/1999 | Laible | |
| 6,045,008 | A | 4/2000 | Gonzalez et al. | |
| 6,082,586 | A | 7/2000 | Banks | |
| 6,126,042 | A | 10/2000 | Meshberg | |
| 6,240,979 | B1 | 6/2001 | Lorscheidt | |
| 6,343,724 | B1 | 2/2002 | Ophardt et al. | |
| 6,409,050 | B1 | 6/2002 | Ophardt et al. | |
| 6,516,976 | B2 | 2/2003 | Lewis et al. | |
| 6,533,145 | B2 | 3/2003 | Lewis et al. | |
| 6,540,117 | B2 | 4/2003 | Powling | |
| 6,540,157 | B2 | 4/2003 | Ophardt | |
| 6,543,651 | B2 | 4/2003 | Lewis et al. | |
| 6,557,736 | B1 | 5/2003 | Ophardt | |
| 6,575,334 | B2 | 6/2003 | Lewis et al. | |
| 6,575,335 | B2 | 6/2003 | Lewis et al. | |
| 6,601,736 | B2 | 8/2003 | Ophardt et al. | |
| 7,004,356 | B1 | 2/2006 | Sayers | |
| 7,011,237 | B1 | 3/2006 | Sayers et al. | |
| 7,104,426 | B2 | 9/2006 | Suzuki | |
| 7,325,704 | B2 | 2/2008 | Kasting | |
| 7,367,476 | B2 | 5/2008 | Law et al. | |
| 7,461,762 | B2 | 12/2008 | Law et al. | |
| 7,654,418 | B2 | 2/2010 | Law et al. | |
| 7,690,535 | B2 | 4/2010 | Law et al. | |
| 7,891,522 | B2 | 2/2011 | Law et al. | |
| 2002/0027144 | A1 | 3/2002 | Lacout | |
| 2003/0132252 | A1* | 7/2003 | Rossignol | 222/207 |
| 2003/0201286 | A1 | 10/2003 | Ophardt | |
| 2004/0217137 | A1 | 11/2004 | Ophardt | |
| 2005/0051579 | A1 | 3/2005 | Kasting | |
| 2006/0043117 | A1* | 3/2006 | Law et al. | 222/257 |
| 2007/0215643 | A1 | 9/2007 | Law et al. | |
| 2008/0197149 | A1* | 8/2008 | Law et al. | 222/153.13 |
| 2008/0308183 | A1* | 12/2008 | Law | 141/380 |
| 2009/0212074 | A1* | 8/2009 | Brouwer | 222/190 |
| 2010/0276515 | A1 | 11/2010 | Milanese | |
| 2012/0097714 | A1 | 4/2012 | Hoefte et al. | |

FOREIGN PATENT DOCUMENTS

| | | | |
|---|---|---|---|
| EP | 0 274 256 | A1 | 7/1988 |
| EP | 0 389 688 | A2 | 10/1990 |
| EP | 0 600 286 | A2 | 6/1994 |
| EP | 0 703 831 | B1 | 12/1998 |
| EP | 1015341 | B1 | 7/2000 |
| EP | 1 092 447 | A2 | 4/2001 |
| EP | 1 190 775 | A1 | 3/2002 |
| EP | 1 449 595 | A1 | 8/2004 |
| EP | 1 514 607 | A2 | 3/2005 |
| EP | 1629900 | | 3/2006 |
| EP | 1 671 705 | A1 | 6/2006 |
| EP | 1 676 640 | A1 | 7/2006 |
| EP | 2 095 882 | A1 | 9/2009 |
| EP | 2 133 153 | A1 | 12/2009 |
| EP | 2 153 908 | A1 | 2/2010 |
| GB | 1149805 | | 4/1969 |
| GB | 2360273 | A | 9/2001 |
| JP | H08-011921 | A | 1/1996 |
| WO | WO 99/49769 | A1 | 10/1999 |
| WO | WO 03/101620 | A1 | 12/2003 |
| WO | WO 2005/049477 | A2 | 6/2005 |
| WO | WO 2010/023462 | A1 | 4/2010 |

OTHER PUBLICATIONS

European Patent Application 05256914.2 Extended Search Report mailed Mar. 2, 2006.

Hygiene-Technik Inc., A member of the Ophardt Group of Companies, UX10 Lotion or Foam Soap Dispenser, 2004, pp. 2.

PCT/GB2011/001001 Search Report and Written Opinion dated Nov. 24, 2011.

PCT/GB2011/001002 Search Report and Written Opinion dated Sep. 26, 2011.

Pictures of Umbrella Valve from RD Industries of Omaha, Nebraska (Pictures 1-6), Jan. 4, 2005.

United Kingdom Patent Application 1100129.4 Search Report mailed Mar. 23, 2011.

* cited by examiner

PUMP DISPENSERS

CROSS REFERENCES TO RELATED APPLICATIONS

This application claims priority to United Kingdom Patent Application No. GB 1000601.0, filed Jan. 14, 2010. This reference is expressly incorporated by reference herein, in its entirety.

BACKGROUND OF THE INVENTION

The present invention relates to pump dispensers comprising a container and a dispenser pump for dispensing fluid product from the container.

Pump dispensers, with a dispenser pump mounted on a container of product, are well-known for dispensing fluid products (liquids, creams, pastes) such as cosmetics and medicaments.

Usually the pump body comprises a cylinder as a fixed component. A piston may be on the inner end of the plunger, whose outer manually-engageable end projects from an opening in the body, and which is reciprocable in a pumping stroke to alter the volume of the pump chamber. Therefore, dispenser pumps are typically of a kind in which the pump chamber is defined between a piston and a cylinder. Liquid product enters the pump chamber through a valved inlet and leaves it through an outlet, usually also valved, leading along an outlet channel to a discharge opening. Commonly used valves include ball and flap valves.

Conventionally the plunger projects upwardly from the top of the pump body and the pump chamber inlet is at the bottom of the pump body, drawing product by suction from the container interior beneath. So, for convenience herein the expressions "top", "upper" etc. are used to refer to positions and directions towards the extended direction of the plunger, and "bottom", "downwards" etc are used analogously to refer to the opposite direction/position, although this particular orientation is not essential. The dispenser is preferably of a hand-held type, used generally upright.

Usually the pump body comprises a generally cylindrical portion constituting the cylinder in which the piston works. The pump components are typically of moulded plastics materials. A pump spring is usually provided to urge the plunger towards its extended position. Many hand-operated dispensers are of the "movable nozzle" type in which the outlet, outlet channel and discharge opening are in the plunger component. Others are of the "fixed nozzle" type in which the outlet from the pump chamber, like the inlet, is part of the pump body so that the discharge channel and discharge opening do not move when the plunger is operated. The present proposals are generally applicable to pump dispensers of both of these kinds except where the context indicates a specific type.

Preferred aspects of the present disclosure relate to dispensers of the "airless" type, in which the internal volume of the container which supplies the pump reduces as product is dispensed so that remaining product is not exposed to air. Such dispensers may use collapsible containers, collapsible container liners or containers with a follower piston which moves up the container behind the mass of product as its volume progressively decreases.

Measures are usually taken to avoid trapping of air in the container when the dispenser is filled and assembled. Usually a pump module—which may comprise the pump itself (body and plunger) mounted via an adapter component to fit the container opening—is pushed into the container opening after the container has been filled. The lower surface of the pump module may be shaped to dip into the fluid product surface as the pump module is pushed in and snapped or screwed into place, with venting of displaced air through the narrow clearance as the pump and container move into engagement. If the product is over-filled (and some variation is inevitable in practice) there is a risk of product being squeezed out through the gap and this must be avoided. One known measure is to start the filling with the follower piston slightly displaced upwards, so that it can move down to accommodate any excess product.

Our EP-A-1629900 shows a dispenser of a relevant general type, in which the pump adapter is downwardly-dished to form a floor which projects down into the container interior and has the inlet opening for the pump chamber. A steeply inclined peripheral wall of the floor extends up to the snap formations which hold the pump in place.

EP-A-1015341 (U.S. Pat. No. 6,240,979) describes a dispenser module in which a tubular chimney extends down around the pump inlet to ensure that when the pump module is pushed onto the container, a full charge of product is initially forced up into the pump chamber.

TECHNICAL PROBLEMS

Difficulties are still encountered with trapped air. This is important when accurate dosing is required, e.g. for medicaments. With a fresh dispenser, usually nothing is dispensed until the pump chamber is fully primed and the user knows when a full dose is achieved. However if air is trapped at some position initially remote from the inlet but reaches later, especially when the container is nearly empty, incomplete doses may be dispensed without the user knowing. Or, remaining product is discarded because an accurate dose can no longer be assured.

Another issue addressed in embodiments herein is to provide pump dispensers that are suitable for direct oral administration of a product e.g. medicine, especially for children. It is desirable to adapt a pump dispenser for safe and effective use in this way.

Other aspects relate in general to the adaptation of pump dispensers for safety and security in relation to children.

THE INVENTION

First Aspect

A first aspect of our proposals relates to dispensers of the airless type. The pump chamber inlet has a downward opening into the container interior. Comprised in or attached to the dispenser module is a dividing wall or trap member, defining an enclosed trap chamber with a restricted entrance, preferably adjacent to the container wall, through which air can enter the trap chamber from the main container interior and be trapped to prevent it from reaching the pump chamber inlet.

Preferably the divider wall slopes upwardly away from the pump chamber inlet, to guide air and/or any excess product toward the entrance(s) of the trap chamber during the filling process.

In a preferred embodiment the trap chamber is defined between a closed floor of the pump module and a (preferably discrete) trap wall member beneath. For example, the pump module floor may have a generally central inlet opening, at or adjacent an inlet valve to the pump chamber. The inlet formation may comprise a downwardly-extending tubular portion, and the divider wall defining the trap chamber extends outwardly from at or adjacent the bottom of this tubular portion. The pump inlet valve may be anywhere in or downstream of the tubular portion. Preferably the tubular portion is comprised in a discrete trap or divider element which also comprises the divider wall, and is fixed e.g. by a push or snap fit onto or into the opening to the pump chamber, e.g. where the valve may be provided in or adjacent the pump module floor.

The entrance to the trap chamber may be a narrow clearance between an annular periphery of the divider wall and the interior of the container wall. The divider periphery may be slightly spaced from the container interior, or it may engage it resiliently e.g. so as to form a seal, but opening to admit air/product into the trap chamber under differential pressure.

Preferably the trap chamber divider wall has a more steeply inclined portion adjacent the entrance opening, to enhance flexibility if there is a flexible lip there, and/or to reduce the local specific volume versus axial height adjacent the entrance, to optimise purging efficiency.

Thus, in one preferred embodiment, the trap chamber is provided by a generally dish-shaped component with an opening surrounded by an upward tubular formation adapted to engage with an inlet formation of the pump module. The floor of the dish slopes upwardly away from the opening, and preferably is more steeply inclined at the periphery. It may have an annular edge, preferably circular, matching the shape of the container interior. It may contact the wall or, e.g. if the product to be dispensed is thick or viscous, a contact seal here may be unnecessary. The opening may be central, assuming that the pump inlet is central in the pump module, or it may be offset if the pump inlet is offset.

The trap divider wall may be a one-piece moulded plastics component. The pump module may be a movable-nozzle or fixed nozzle pump.

In the preferred embodiment using a follower piston in a container, desirably the face of the follower piston is shaped to complement the face of the dividing wall so as to minimise wasted product. In particular this may involve an inclined face, e.g. a generally conically-inclined face, corresponding to an inclined downward face of the dividing wall of the trap chamber. Additionally or alternatively, where the trap chamber/pump inlet has a tubular conduit portion, the front of the follower piston may have a corresponding projection or boss which fits into this tubular conduit portion as the follower piston approaches the underside of the pump module.

Second Aspect

A second aspect of our proposal is preferably used with an airless dispenser, and preferably with an airless dispenser according to the first proposal above, but is also applicable with other kinds of dispensers. These proposals have been developed to address problems associated with dosing medicines to children, but have wider application.

They are for dispensers of the moveable-nozzle pump type. Most moveable-nozzle dispensers have an outlet valve, which is important for achieving good re-filling of the pump chamber on return of the plunger after a dispensing stroke, and also for reducing the access of air to product in the pump chamber. Typical outlet valves use balls or flaps, usually gravity-actuated and often also resiliently sprung or urged towards the closed position. A preferred embodiment herein is a pump dispenser for administering medicaments orally. The dose can be determined by the dimensions of the pump chamber and stroke. However it is possible that a child will suck on the pump nozzle and received an enlarged dose, because conventional pump valves allow flow under forward pressure.

The pump plunger incorporates a discharge passage leading from the pump chamber to a nozzle outlet. At least in a rest position of the plunger (typically an extended position, to which the plunger may be urged by a pump spring) this discharge passage incorporates a closure mechanism which blocks the discharge passage against downstream flow under downstream fluid pressure (e.g. from sucking on the nozzle), but opens when the plunger is pressed in a dispensing stroke. Since the blocking mechanism should not be opened by a downstream fluid pressure differential, it is desirably opened by relative sliding movement between first and second plunger components, driven by manual pressure on the plunger. Preferably this is movement between a stem portion and a piston portion of the plunger, the piston portion being or comprising a component operating in the pump chamber itself. The stem portion may have one or more lateral flow openings and, upstream thereof, a sealing region. The piston component provides a complementary sealing region. In an extended position of the stem relative to the piston component, these sealing regions engage one another and isolate the flow opening(s) of the stem from the pump chamber. When the stem is depressed, it moves downwardly relative to the piston, separating the sealing regions and opening up access from the pump chamber so that product can be dispensed along the outlet passage. After a predetermined degree of this relative movement (lost motion) the stem engages the piston component to drive it downwardly for dispensing. It will be understood that a closure mechanism or valve openable by force on the top of the plunger might alternatively be provided by some other means, or at some other position along the discharge passage, provided that appropriate relatively-movable parts are incorporated in the plunger construction. A further possibility is for the flow opening(s) of the plunger to be closed by engagement of a plunger sealing region with a fixed sealing region which is on the pump body. However, this is usually less easy to engineer in the situation where the plunger carries an enlarged piston slidable in a cylinder of the pump body.

In a preferred embodiment the plunger stem comprises a tubular component with closed end and one or more said laterally-directed flow openings. The bottom end fits in a tubular portion of a relatively axially moveable outer stem portion, preferably in one piece with a piston component. The stem tube has an upwardly-directed abutment engageable with a corresponding downward formation on the outer portion to limit the relative upward movement of the central tube. The upward abutment may have a said sealing surface to isolate the entrance opening(s). Additionally the tube portion has a downwardly-directed abutment which, after a predetermined axial displacement from the mentioned upward position, meets a corresponding upwardly-directed abutment on the outer component so that the central tube drives the outer component (piston formation) down with it.

Third Aspect

Another aspect of the second set of proposals relates to the disposition of the discharge nozzle in relation to the other components of the dispenser. In this aspect the discharge nozzle is laterally directed, preferably at some angle between horizontal and 45° above horizontal, and has or comprises a projecting tube which may be suitable to be put in the mouth.

The nozzle is rotatable, about a generally upright axis of the pump module, between an accessible operational orientation and an obstructed stowed orientation.

In one subsidiary aspect, in the operational orientation the end tube of the nozzle projects free to be inserted in the mouth. In the stowed orientation the nozzle tube lies adjacent an obstructing formation of the pump to hinder insertion of the tube in the mouth. To this end, the pump body or the pump plunger may be made with a casing shape which rises higher at one side of the pump than at the other, providing an obstructing formation. Preferably the obstructing portion is a portion of the plunger, and the plunger nozzle and the portion of the plunger providing the obstructing formation are relatively rotatable.

Additionally or alternatively, in another subsidiary aspect the nozzle tube itself changes height as it rotates between the operational and stowed orientations. This may be by a cam or screw thread mechanism and/or by a non-vertical rotation axis of the rotating nozzle.

A further separate but combinable subsidiary aspect relating to the plunger nozzle construction is that rotation of the nozzle relative to the rest of the plunger moves an internal discharge passage blocking mechanism between blocked and unblocked conditions. This feature may be additional to, independent from or supplementary to the proposals discussed above for a mechanism closing the discharge passage in the rest condition of the plunger. The present proposal may involve relative axial movement between two parts of the plunger on rotation of the nozzle, e.g. by cam or thread action, so that a plug portion on one enters an opening on the other and closes the discharge passage. This mechanism may be operable irrespective of the position of the plunger relative to the pump body. The blocked condition may correspond to the obstructed stowed position referred to above, when these two subsidiary aspects are combined. It provides additional security against leakage of product out or air in.

A further subsidiary proposal, in relation to a nozzle moveable between operation and stowed positions according to any of the subsidiary aspects above, is that where the dispenser has a removable/liftable outer cap or cover which will cover the entire plunger top (engaging on the fixed pump body or container edge), this outer cap or cover cannot be fitted in place when the nozzle is in the operation position.

An operational nozzle position that prevents the cover cap from being fitted may be achieved in various ways, depending on the shape and movement locus of the nozzle and the shape of the cover cap. The nozzle in the operation position may project too high and/or too far laterally for the cap to fit on, or it may have an otherwise non-fitting shape relative to the cover. A simple cover cap shape (preferably cylindrical) is usually preferred, so lateral and/or vertical projection of the nozzle tube outside the secured cap position is preferred. For example as mentioned above the nozzle may project higher in the operation position if it has a non-vertical rotation axis. It may project laterally outside the cover cap position if it has an eccentric axis, for example, the plunger stem axis and perhaps the entire pump body being positioned eccentrically in relation to the pump module.

Fourth Aspect

A final subsidiary aspect, again combinable with any of the other aspects above, relates to a tip cover for a nozzle tube i.e. a cover for the final outlet of the nozzle. Known dispensers may have a removable plug for this opening. These plugs tend to be mislaid or forgotten (unless attached by a tie), so that product in the discharge passage is exposed to air and may dry out. In general, dispensers herein may comprise a cover for the discharge opening, and this may or may not be a directional flow valve.

We propose particularly the use of an alternative in which the rigid nozzle tip tube has an elastomeric cover which in its rest position closes one or more discharge openings of the tip tube but when subject to forward pressure (during a dispensing stroke) flexes away from the tip tube to let product flow out. Preferably the elastomeric cover comprises a front cap portion with a central outlet hole, and the one or more discharge openings of the tip tube are laterally offset with respect to this. The tip tube may have a front plug projection to fit into the flexible cover outlet hole, clearing out any product residues and closing it positively when the cover is in its rest position. The cover may be held on the nozzle by a tubular rear sleeve extension. It may be of generally uniform thickness. A front cap portion thereof may be outwardly convexly curved inside and out, and lie against a complementarily convex front surface of the nozzle tip.

In all aspects of the invention, our proposals cover a method of use of the dispenser to dispense the product, a method of administration of an oral medicament using the dispenser, and a method of assembling the filled dispenser by connecting the pump module to the container. The dispenser filled with an oral liquid medicament is a further aspect.

Embodiments of our proposals are now described, with reference to the attached drawings.

BRIEF SUMMARY

Pump dispensers, especially of the airless type, in which the container interior reduces its volume progressively as product is dispensed to avoid air contact with the product, e.g. a medicine for oral dosing. One aim is to prevent any air in the container space above the product from reaching the pump inlet, and thereby possibly reducing a dispensed dose without the user being aware. To trap any such air and keep it away from the inlet throughout use of the dispenser, an air trap member (5) having a downwardly-convex dish form is provided below the floor of the dispenser module around the inlet, to guide any such air away from the inlet and to the periphery. At the periphery a steeply-sloping peripheral portion forms a retaining lip (53), which may make flexible wiping contact with the container wall interior, allowing air past on assembly of the dispenser. A central tubular formation (52) of the trap member (5) separates the trapped air from the inlet, and can be used to plug the trap member into the inlet. A sliding follower piston (15) may have an upward central boss (152) shaped to fit into the tubular formation (52) of the trap member (5) to maximize expulsion of product.

One object of the present disclosure is to describe an improved pump dispenser.

DETAILED DESCRIPTION

Figure 1:
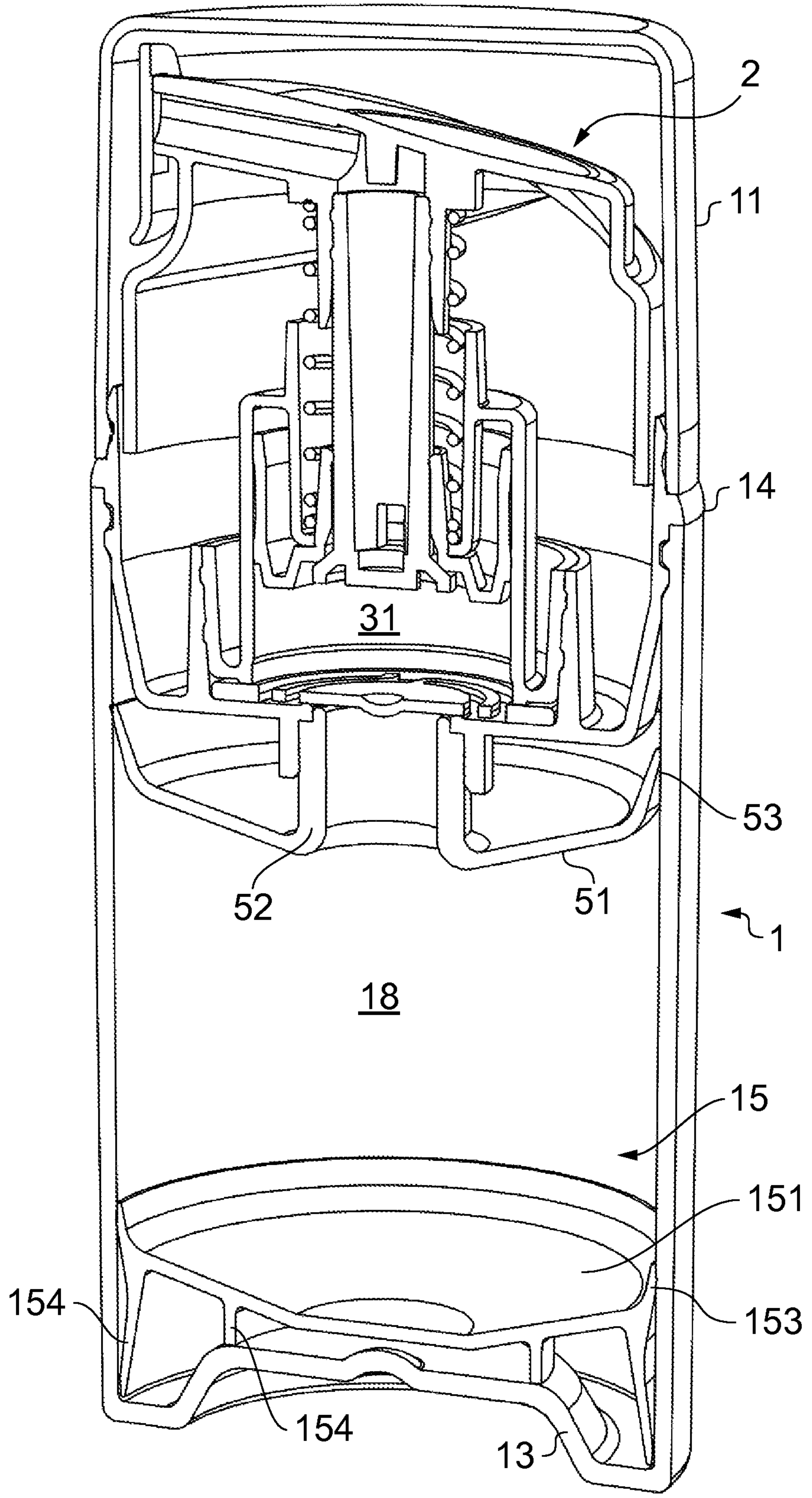
FIG. 1 is an axial cross-section view of a first embodiment of dispenser pump, with the components in an as-filled position.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Figure 2:
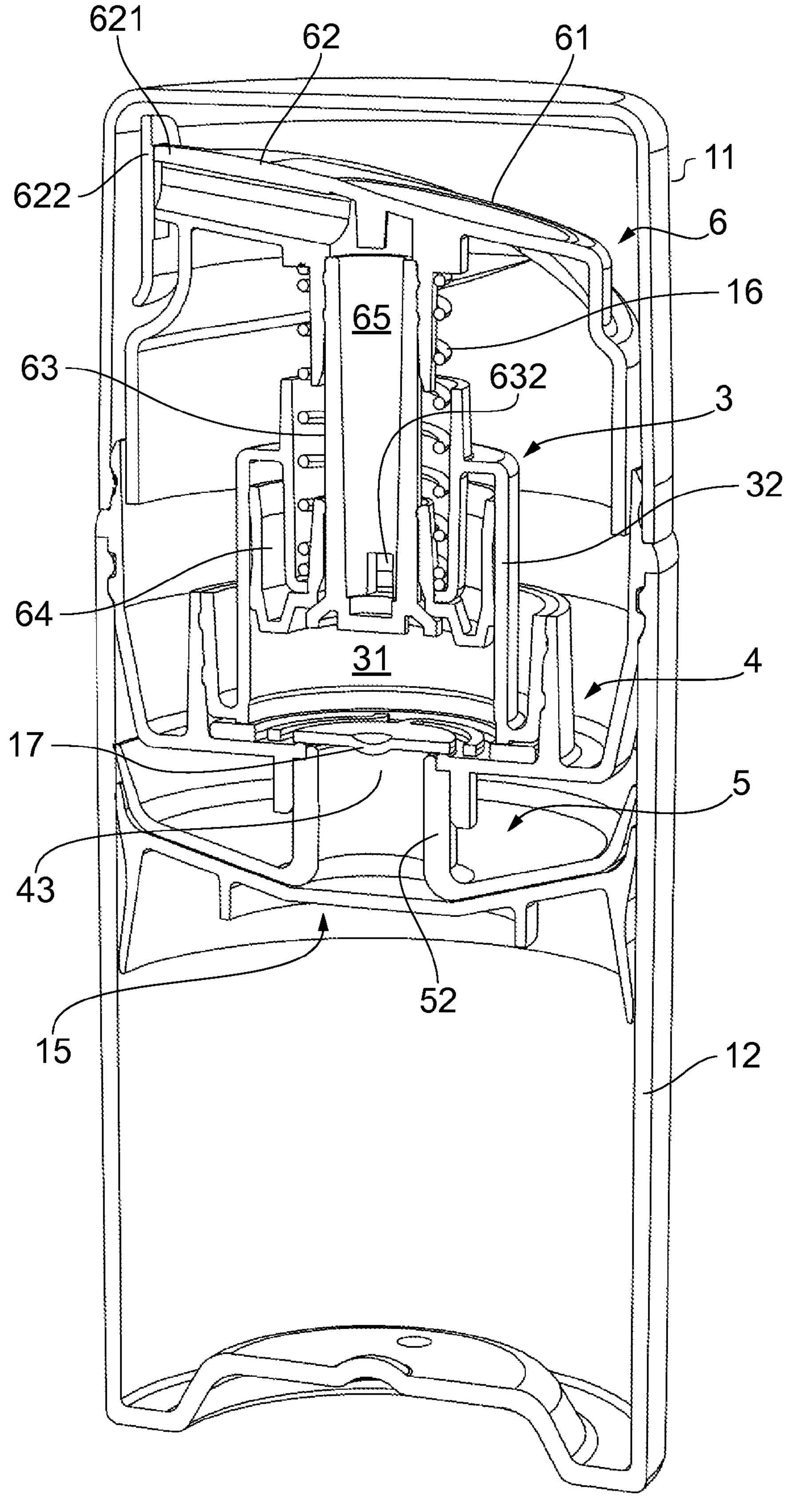
FIG. 2 shows the FIG. 1 dispenser as empty.
Figure 3:
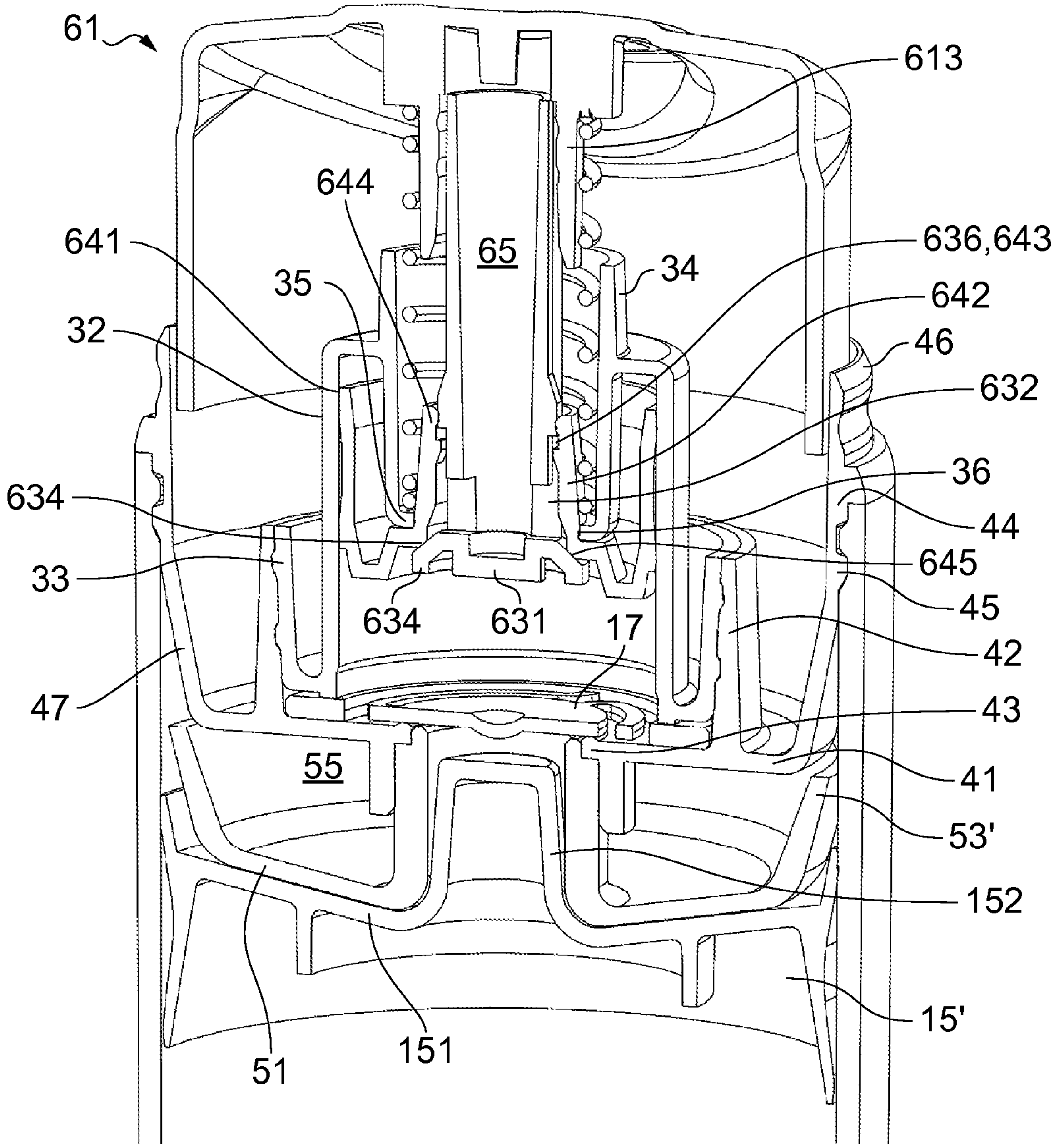
FIG. 3 is an enlarged view of the upper part of the dispenser, with the axial cross-section at right angles to that in FIG. 1, and showing a variant follower piston construction.

With reference to FIGS. 1 to 3, a hand-operated dispenser comprises a cylindrical container 1, a pump module 2 mounted in the circular neck opening 14 of the container and a cover cap 11 which covers the pump module 2. The main components of the pump module 2 are a pump plunger 6, a pump body 3, a pump body base or adapter 4 and a trap insert 5. See FIG. 2.

A circular follower piston 15 operates in the interior space 18 of the container 1. FIG. 1 shows an initial position, as in the full container, and FIG. 2 shows a final position as when all possible product has been dispensed. The follower piston 15 has a circular sealing lip 153, a dished central web 151 and annular support ribs 154 to support it initially above the container base 13.

In a generally conventional way, manual depression of the plunger 6 against the pump spring 16 reduces the volume of the pump chamber 31 defined by the cylinder 32 of the pump body 3, forcing product along the outlet passage 65 to the nozzle 62. When the spring 16 returns the plunger 6 to its extended position, suction in the pump chamber 31 draws further product in from the container space 18 through the inlet opening 43 and associated inlet valve 17, ready for a further stroke. At the same time the follower piston 15 rises slightly. Specifics of the mechanism are now described further.

The pump body base or adapter 4 is generally dish-shaped or bowl-shaped, with a flat floor 41, a steeply upwardly inclined peripheral wall 47 having upper and lower snap formations 46,45, a central inlet opening 43 through the floor 41 and a concentric upstanding skirt 42 into which the pump body 3 is locked. With the lower snap ribs 45 snapped into the neck opening 14 of the container 1, the floor 41 of the pump module base is suspended down inside the container volume.

The pump body 3 comprises a downwardly-open pump cylinder 32 whose lower edge folds outwardly round into a vertical locating skirt 33, which plugs into the central skirt 42 of the base 4. At the top, the walls of the cylinder 32 extend inwards and define a central opening 36 to receive a stem 63 of the plunger 6, surrounded by a top mounting sleeve 34 which provides a lower seat 35 and guide for the pump spring 16.

An inlet valve 17 is fixed across the inlet opening 43, on the floor 41 of the pump base 4. In this embodiment the inlet valve 17 is an axially-moving flap valve, with a central circular moveable flap covering the opening 43 and connected via a set of flexible legs to a peripheral mounting ring. Other forms of valve may be used.

The plunger 6 comprises a top shell 61 with an outwardly-extending skirt 162 whose lower edge overlaps down inside the top of the upstanding skirt 42 of the pump base, thereby enclosing the mechanism. This top shell 61 also comprises the nozzle 62 and its associated part of the outlet passage 65, which may initially be closed by a plug 622 at the nozzle tip 621 (FIG. 2). A tubular stem piece 63 plugs into a tubular snap socket 613 of the shell 61 to complete the outlet channel. The tubular stem 63 extends down through the top sleeve and opening 34,36 of the cylinder body and terminates in a closed foot 631. Flow openings 632 are provided, facing laterally, through the stem tube walls immediately above the foot 631. Around the foot is a circular end flange 634 with a conical upwardly-directed sealing surface 635.

The piston component 64 comprises an inner sleeve 642 fitting around the bottom end of the stem 63 to connect these components. FIG. 3 shows, at diametrically opposed positions, respective upwardly- and downwardly-directed abutment surfaces 643,636 on the piston inner sleeve 642 and tubular stem 63 and a top annular retaining rib 644 on the piston inner sleeve, whereby the piston component 64 is carried on the stem 63 with limited axial relative movement. In the position shown (the extended rest position) the spring 16 urges the stem 63 to its highest position relative to the piston 64. Here, its conical flange sealing surface 635 meets a complementary downwardly-directed conical sealing surface 645 at the bottom end of the inner piston sleeve 642, isolating the flow openings 632 from the pump chamber 31.

When the plunger is pressed, friction of the outer piston seal 641 against the cylinder wall holds it initially in place while the stem 63 moves downwardly until the stop abutments 636,643 meet, whereupon the piston 64 is also driven downwardly. The small initial relative movement separates the sealing surfaces 634,645 and allows fluid to flow from the pump chamber 31 through the flow openings 632 to the outlet passage 65 to be dispensed.

Forward fluid pressure across this outlet valve construction tightens its seal, so it prevents release of fluid if the container is squeezed or the nozzle sucked.

Next, an air-trapping feature is described. The trap insert 5 is a single molded plastics component having a dished form, with a central open tubular portion 52 snap fitted into or onto a complementary formation of the pump base around the inlet opening 43. The main web 51 of the trap insert is gently conically inclined upwardly and outwardly, e.g. at from 5° to 20°. At its outer periphery it inclines more steeply upwardly, e.g. at from 60° to 80°, to form a retaining lip 53 which, in the FIG. 1 version, makes flexible wiping contact with the interior of the container wall 12. Thus, a trap space 55 is defined above the trap insert and below the adapter floor 41. Fluid in this trap space 55 is separated from the pump inlet 43 by the tubular wall 52 of the trap insert. Note also (FIG. 2) that the conical webs of the trap insert 5 and follower piston 15 are complementary, so that they fit against one another to minimize product waste when the container is emptied.

FIG. 3 shows a variant. Firstly the peripheral retaining lip 53' of the trap insert is slightly thicker, does not flex and is slightly spaced from the interior wall surface of the container 1. Secondly, the follower piston 15' is formed with an upward central boss 152 which fits into the tubular trap surround 52, helping to ensure full clearance of the product from the container.

Figure 4:
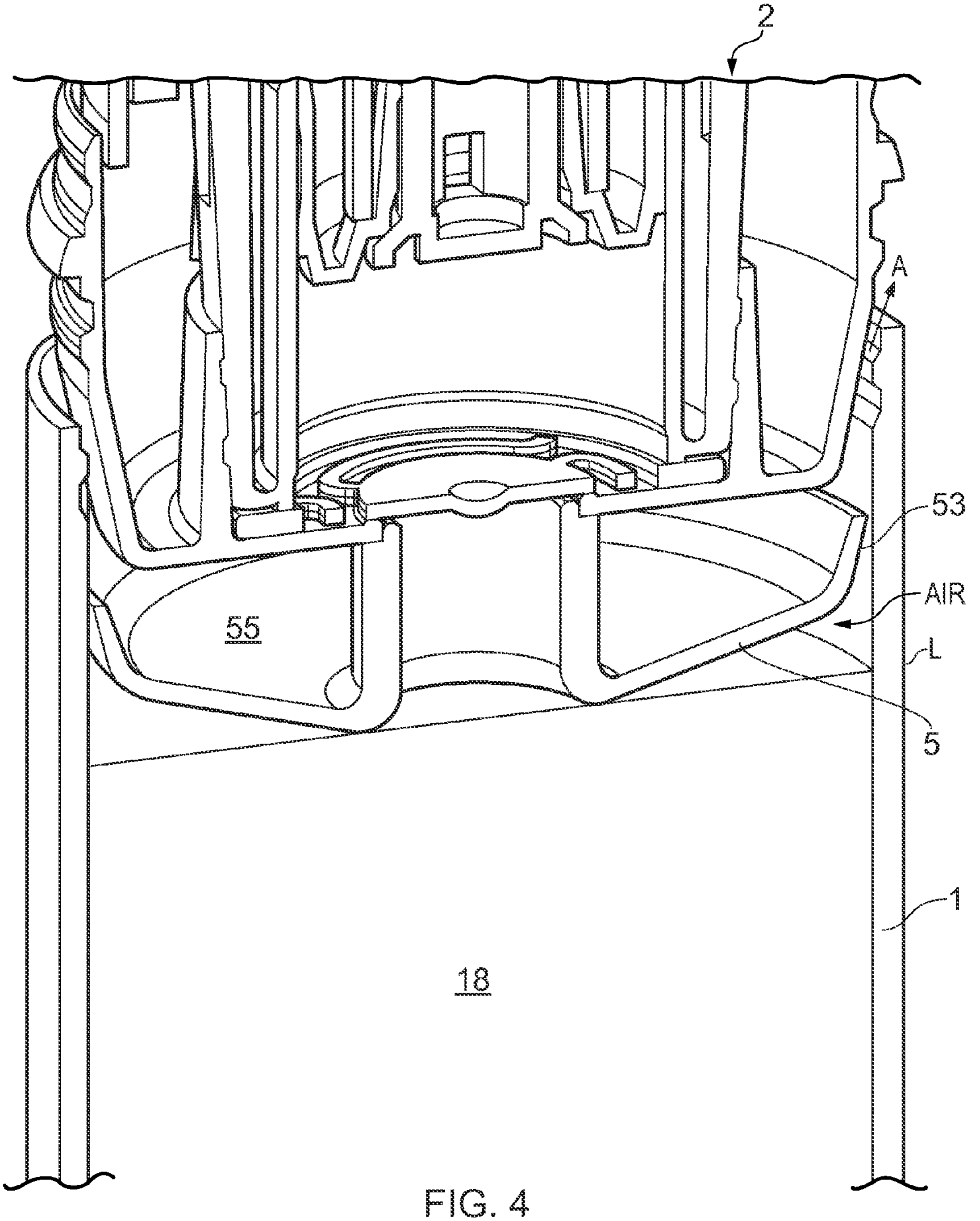
FIG. 4 is a fragmentary cross-section showing a trap component in relation to a product fill level during assembly.
Figure 5:
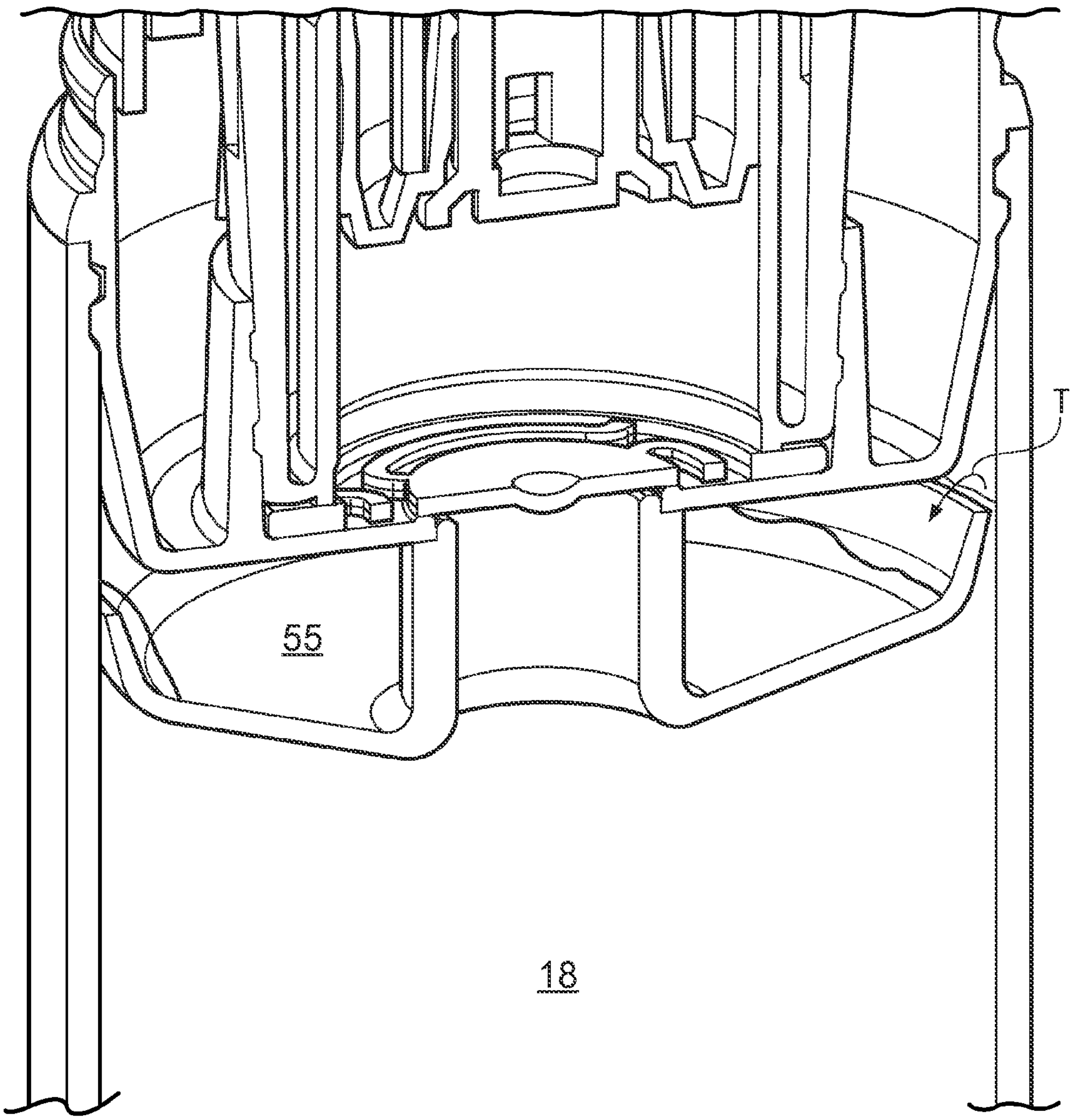
FIG. 5 shows the FIG. 4 view with assembly complete.
Figure 6:
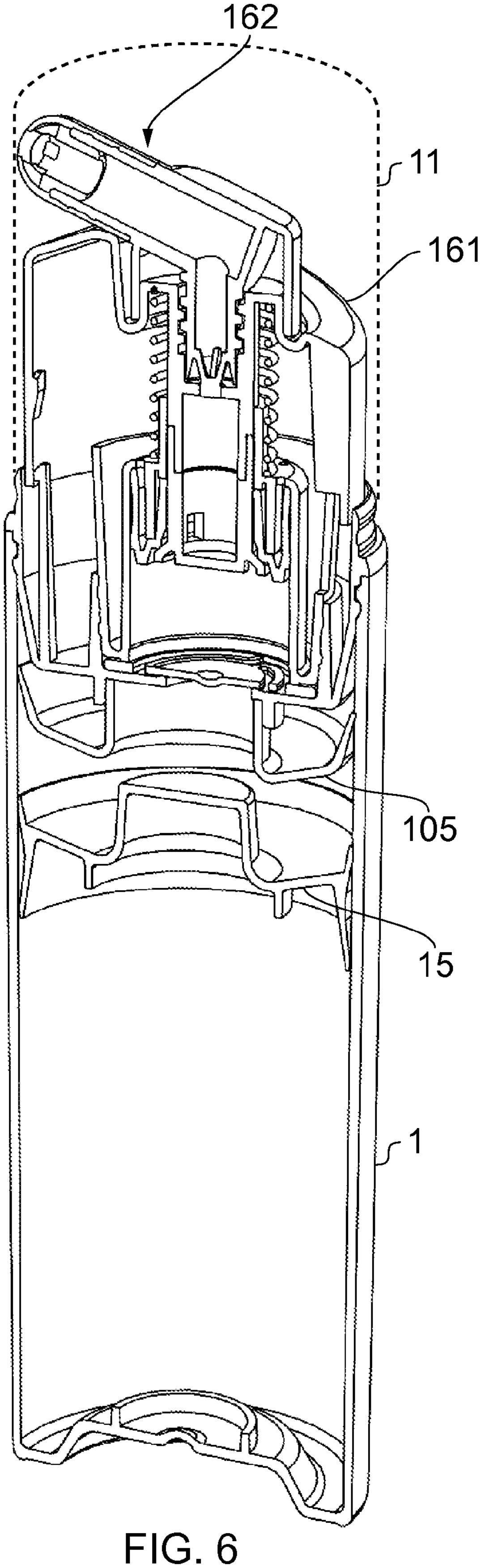
FIG. 6 is an axial cross-section of a second embodiment of dispenser pump, with a nozzle in a stowed position.
Figure 7:
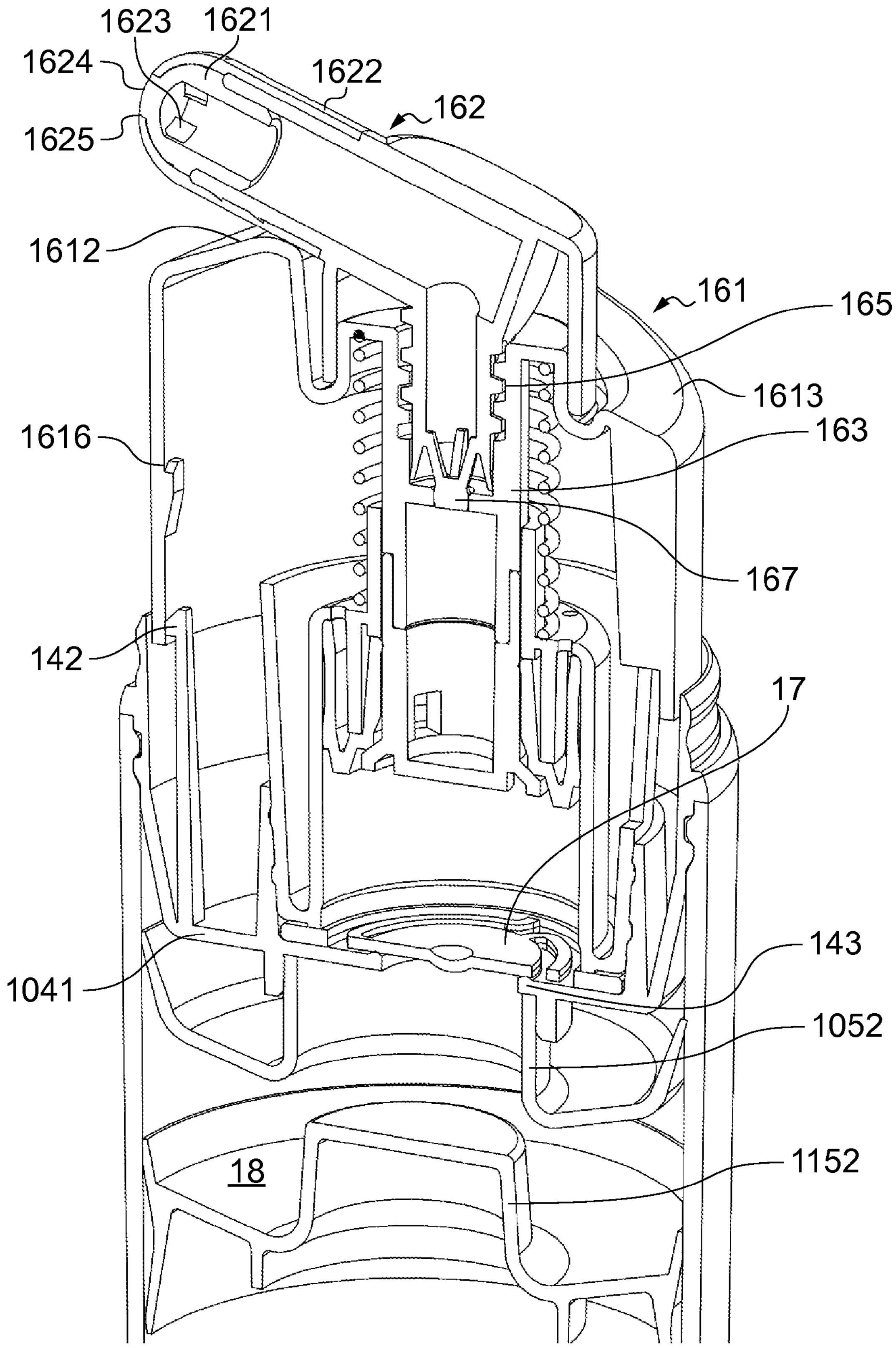
FIG. 7 is a closer view of the pump components of the second embodiment, in the FIG. 6 position.
Figure 8:
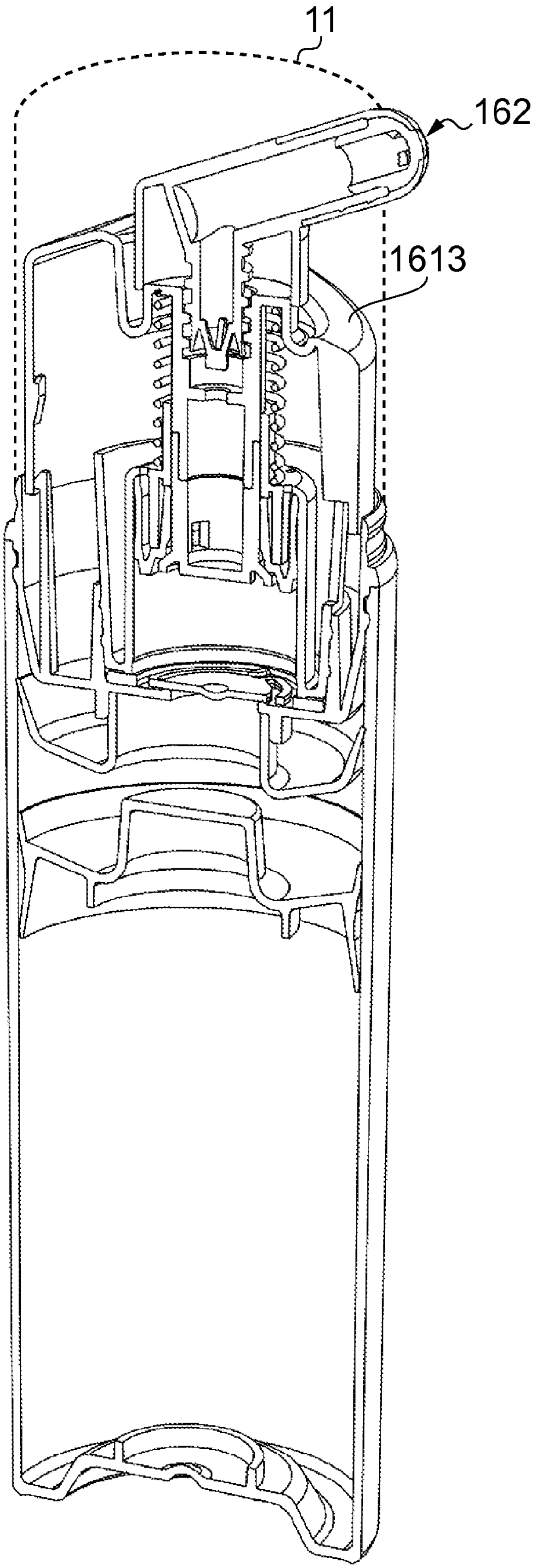
FIG. 8 shows the second embodiment with the nozzle in an operational position.

FIGS. 4 and 5 show the important behaviour of the trap insert 5 during filling and assembly. Initially the container 1 is filled to a level "L" (FIG. 4) e.g. using a conventional "diving" nozzle. Less conventionally, this may be done with the follower piston 15 right at the bottom of the container, rather than slightly raised (as has often been the practice to accommodate any excess of filled product). Inevitably the exact level L varies slightly from one fill to another. The dispenser module with the trap insert 5 attached is pushed in from above. The lowest part, around the central tube 52, meets the product surface first. At this stage the container and adapter snap formations are not yet engaged, and displaced air can escape through the clearance between them: arrow "A". According to its design, the peripheral lip 53 of the trap insert 5 allows air to pass out upwardly, either through the clearance (FIG. 3) or by flexing (FIGS. 1, 2). As the module dips into the liquid product, there is a tendency for product to rise through the inlet 43 and into the pump chamber. However, such product rise is very limited, because air is locked in the pump chamber by the nozzle plug 622 and the stem/piston seal 634,645. As the pump and container move to the fixed and sealed position (FIG. 5) air can no longer escape during the final stage of movement. In conventional dispensers, it is at this stage that air may be unavoidably trapped, and enter the product inlet subsequently. However in the present dispenser as shown in FIG. 5, the displacement caused by the trap insert 5 dipping down into the liquid ensures that all air, and in some cases a small excess of liquid product, is driven around the periphery 53,53' of the trap insert and into the trap chamber 55. In FIG. 5, arrow "T" shows this flow.

This trapped air is then unable to get to the pump inlet at any stage during use of the dispenser. While the user needs to pump air initially to prime the pump for the first dose, all subsequent doses should be complete (i.e. without air occlusions) until the container is emptied.

FIGS. 6 to 9 show a second embodiment. As regards the provision of a trap insert 105, and the principle of operation of this, it is similar to the FIG. 3 embodiment except that the central tube 152 and corresponding follower piston boss 1152 are larger in diameter for reasons explained below. Incidentally, in this embodiment, as in the FIG. 3 embodiment, the boss 152,1152 does not fit closely in the internal diameter of the tube 52,1052. Until the follower piston finally meets the trap insert, clearance is needed for product to flow up to the inlet 43 between boss and tube.

In the second embodiment, the laterally-directed nozzle 162 is discrete from the plunger shell 161, and is connected to the tubular stem 163 by a coarse-threaded connection 165. This enables the nozzle 162, which is angled upwardly at about 30%, to be pivoted about the vertical stem axis between the stowed position seen in FIGS. 6 and 7 and the operational position seen in FIGS. 8 and 9. Associated with this movement are three distinctive supplementary features.

Firstly, the top of the plunger shell 161 is formed with a high side 1612 and a low side 1613. In the stowed position (FIG. 7) the nozzle tip 162 lies closely on top of the high side of the plunger shell so that it cannot easily be put in the mouth. This is a dispenser intended for dosing medicine directly into a child's mouth. In contrast when the nozzle 162 faces the other way (operational position) it stands well clear above the low side 1613 of the shell 161.

A second feature is that the entire pump is mounted off-center. See FIG. 9. The adapter or base plate 104 has its inlet opening 143 and cylinder body mounting skirt formed off-center so that the axis "P" of the pump is laterally spaced from the axis "C" of the container and follower piston. The nozzle 162 rotates about the stem axis, which is the pump axis P. This has the important consequence that, in the stowed position (FIGS. 6 and 7), its tip is relatively retracted in relation to the shape envelope of the dispenser seen in plan. In particular, it fits inside the cover cap 11, whose interior shape is indicated in broken lines in FIG. 6. When facing in the opposite direction (FIGS. 8 and 9) the nozzle 162 extends out beyond the plan shape envelope of the container, and the cover cap 11 cannot be put on. This encourages retraction of the nozzle 162 to the stowed position for storage.

In combination with this, the threaded mounting 165 of the nozzle 162 on its stem 163 causes it to rise as it is rotated to the operational position. A rotation of 180° suffices (multi-start thread), and stop abutments (not shown here) are provided to limit the rotation at one or both of the two positions.

The combination of these three features gives a radical difference in accessibility of the nozzle between the stowed and operational positions.

Figure 9:
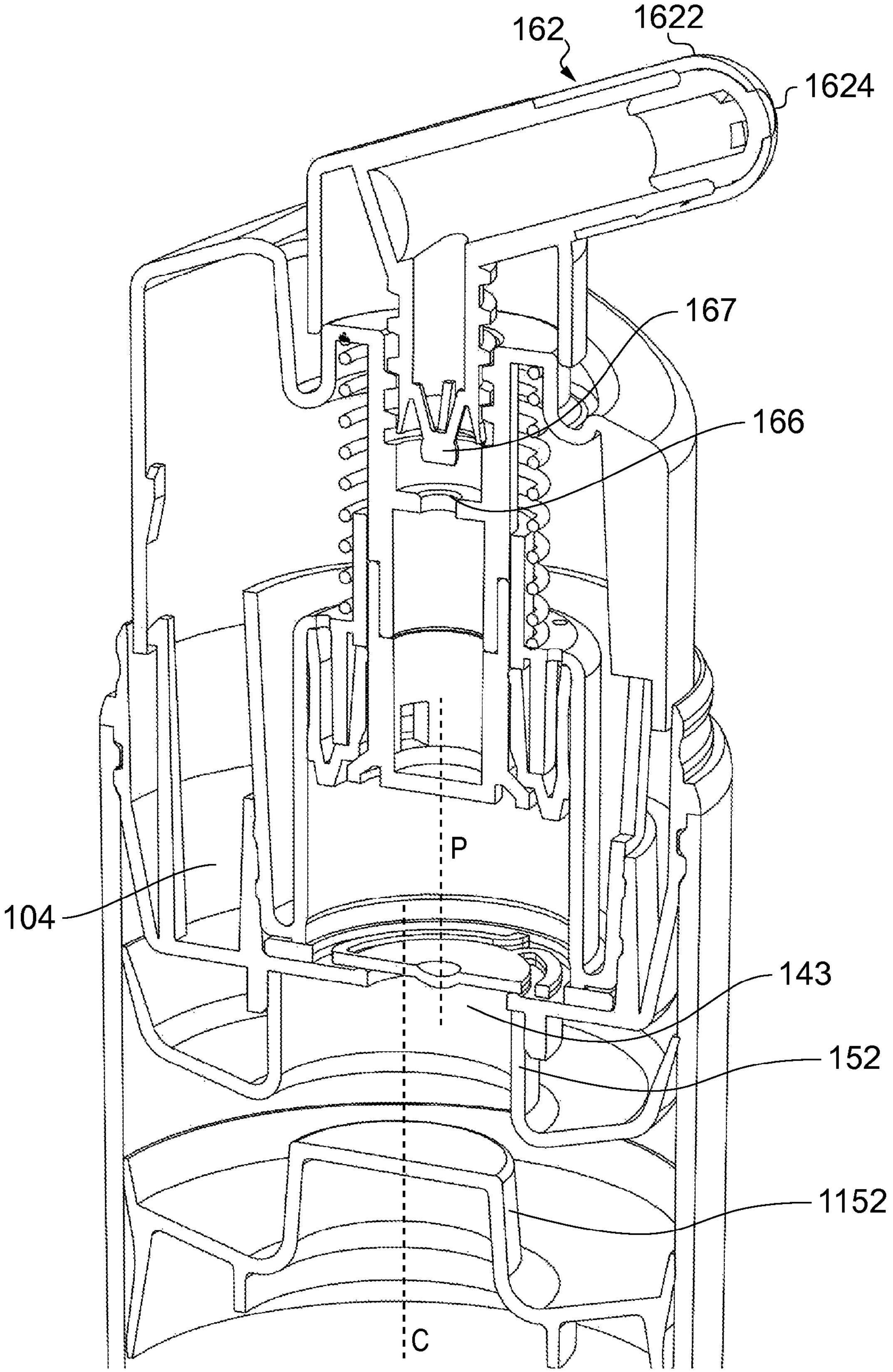
FIG. 9 is a close-up of the pump in the FIG. 8 position.

Additionally, in this embodiment the bottom end of the threaded nozzle fitting carries a downwardly-projecting plug 167 which, in the lowermost (stowed) position of the nozzle 162, blocks an orifice 166 in the stem part of the outlet passage (FIG. 9). This provides further isolation of the flow system, especially for storage and for transit when a sudden pressure on the container might force open the sprung stem seal. It also helps to prevent product drying in the dispenser after use begins.

It will be appreciated that some suitable tamper-evident device may be provided for displacement of the nozzle 162 initially from its stowed position.

The figures also show an optional arrangement, an independent aspect of our proposals, whereby an audible signal is given when the plunger reaches the bottom of a full stroke, to show that the intended dose is achieved. Catch projections 1616 on the interior of the plunger shell 161 are temporarily engageable by clicker hooks 142 extending up from the adapter base 1041.

A further feature in this embodiment is the adaptation of the nozzle tip outlet. Instead of a single forward opening with a plug, the nozzle is fitted with a tip unit insert 1621 providing an annular set of outlet openings 1623 directed forwardly and sideways, while the center is closed and carries a forwardly-projecting plug projection 1624. A thin rubber closure or cover sleeve 1622 fits over and around the nozzle and nozzle tip, and has a cap or dome-shaped front end with a single central front opening 1625. In the rest position shown, the tip plug 1624 blocks the cover opening 1625 while the cover region around the cover opening 1625 covers the tip openings 1623. The tip is therefore securely closed and protected from dirt and from drying out. When the plunger is depressed to dispense product, fluid pressure expands the front cap region of the cover 1622 so that the cover opening and tip openings are simultaneously opened and put in communication with one another and product is dispensed centrally through the cover opening 1625. After dispensing, the cover retracts and closes spontaneously.

It was mentioned above that in this embodiment the trap insert 105 has a wider central tube 152 than the first embodiment. This is so that the trap tube 152 can remain centrosymmetric while still providing full access to the off-center inlet opening of the pump. Alternatively the trap tube can itself be formed off-center like the inlet.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A pump dispenser comprising:

a container which is constructed and arranged to contain a fluid product to be dispensed and defining a top opening; and a pump module fitted into the top opening of the container and comprising a pump body, a pump plunger and an adaptor portion whereby the pump body is fitted into the container opening, the pump body and pump plunger defining a pump chamber between them and the pump plunger being reciprocable relative to the pump body in a pumping stroke to alter the volume of the pump chamber, the bottom of the pump module providing an inlet to the pump chamber from the container interior and comprising an inlet valve for the inlet, and said container further being adapted to reduce its internal volume for fluid product progressively as the product is dispensed, wherein the pump module includes a dividing wall defining an enclosed trap chamber, separated from the pump chamber inlet and having a restricted entrance through which any air in the container interior above the liquid product can enter the trap chamber to prevent the air from reaching the pump chamber inlet, wherein the pump module has a closed floor, a tubular inlet formation extending down relative to the closed floor from an inlet opening of said floor leading to the pump chamber, and a trap wall member beneath the closed floor, the trap wall member extending outwardly from at or adjacent the bottom of said tubular inlet formation to constitute said dividing wall.

2. The pump dispenser of claim 1 wherein said dividing wall for the trap chamber slopes upwardly away from the inlet towards the restricted entrance to the trap chamber.

3. The pump dispenser of claim 2 wherein the restricted entrance to the trap chamber is adjacent to the container wall.

4. The pump dispenser of claim 3 wherein said dividing wall is generally conical in form.

5. The pump dispenser of claim 1 wherein the trap chamber dividing wall has a portion adjacent the restricted entrance opening which is more steeply inclined than a portion adjacent the inlet.

6. The pump dispenser of claim 1 wherein the trap wall member is a discrete member which connects to the closed floor of the pump module.

7. The pump dispenser of claim 6 wherein said tubular inlet formation is comprised in the discrete trap wall member.

8. The pump dispenser of claim 1 wherein the trap chamber dividing wall is provided by a generally dish-shaped component having a circular edge matching the container interior, a vertical tubular inlet formation communicating with the pump chamber and a surrounding dished floor portion sloping upwardly away from the bottom of the tubular inlet formation.

9. The pump dispenser of claim 1 which further includes a follower piston disposed in the container.

10. The pump dispenser of claim 9 wherein a top portion of the follower piston is shaped to complement a bottom portion of the trap dividing wall.

11. The pump dispenser of claim 10 wherein the follower piston has a projection or boss which fits up inside a tubular inlet formation of the pump chamber inlet when the follower piston approaches the underside of the pump module.

12. A method of assembly of the pump dispenser of claim 1 which includes a container and a pump module, comprising the following steps:

filling the container with fluid product;

fitting the pump module into the top opening of the container from above with the underside of the pump module dipping into the fluid product;

initially displacing air to the atmosphere through a clearance between the container opening and the pump module before making sealing engagement between the two; and subsequently displacing air into said trap chamber through said restricted entrance thereof.

13. A pump dispenser comprising:

a container which is constructed and arranged to contain a fluid product to be dispensed and defining a top opening; and a pump module fitted into the top opening of the container and comprising a pump body, a pump plunger and an adaptor portion whereby the pump body is fitted into the container opening, the pump body and pump plunger defining a pump chamber between them and the pump plunger being reciprocable relative to the pump body in a pumping stroke to alter the volume of the pump chamber, the bottom of the pump module providing an inlet to the pump chamber from the container interior and comprising an inlet valve for the inlet, and said container further being adapted to reduce its internal volume for fluid product progressively as the product is dispensed, wherein the pump module includes a pump base and a trap insert which is assembled to said pump base, said pump base and said trap insert defining a trap chamber for receipt of air, wherein a flow path for said air is defined between a portion of said trap insert and a wall of said container.

14. A pump dispenser comprising:

a container which is constructed and arranged to contain a fluid product to be dispensed and defining a top opening;

a pump module fitted into the top opening of the container and comprising a pump body, a pump plunger and an adaptor portion whereby the pump body is fitted into the container opening, the pump body and pump plunger defining a pump chamber between them and the pump plunger being reciprocable relative to the pump body in a pumping stroke to alter the volume of the pump chamber, the bottom of the pump module providing an inlet to the pump chamber from the container interior and comprising an inlet valve for the inlet, and said container further being adapted to reduce its internal volume for fluid product progressively as the product is dispensed, wherein the pump module includes a dividing wall defining an enclosed trap chamber, separated from the pump chamber inlet and having a restricted entrance through which any air in the container interior above the liquid product can enter the trap chamber to prevent the air from reaching the pump chamber inlet; and wherein said dividing wall for the trap chamber slopes upwardly away from the inlet towards the restricted entrance to the trap chamber and wherein the restricted entrance to the trap chamber is adjacent to the container wall.

* * * * *